Patented June 14, 1938

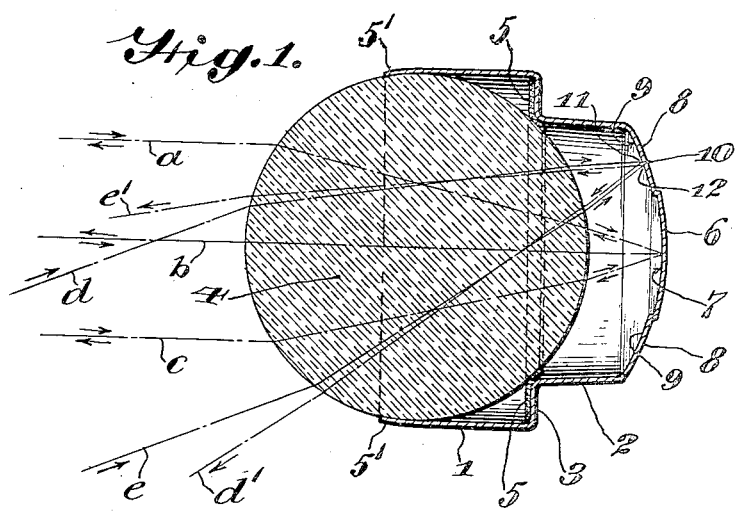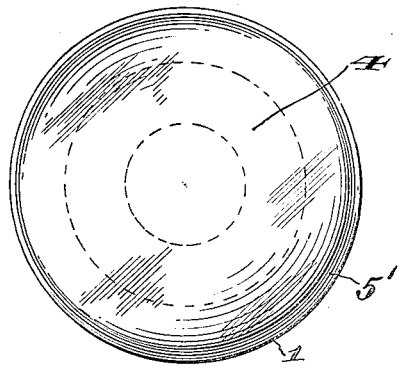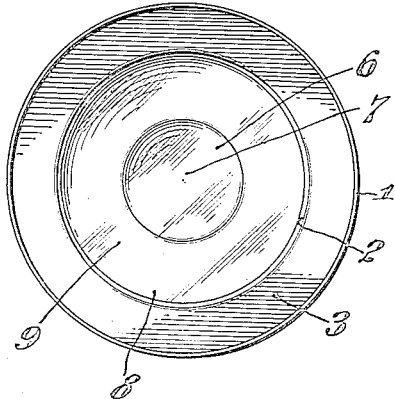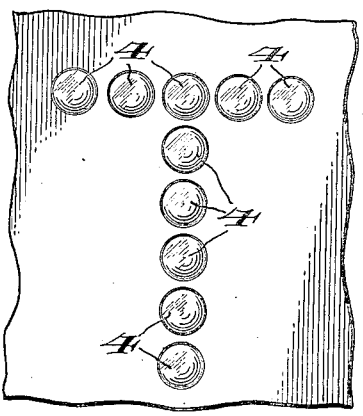

2,120,524

UNITED STATES PATENT OFFICE 2,120,524

SELF-FOCUSING REFLECTOR DEVICE

Richard W. Luce, Westfield, N. J., assignor to American Gasaccumulator Company, Elizabeth, N. J., a corporation of New Jersey Application August 30, 1929, Serial No. 389,338
Renewed March 6, 1934

7 Claims. (Cl. 88—82)

This invention relates to reflector devices of that class which are adapted for use as guides to traffic upon highways, streets and the like, and also are adapted for use upon automobiles and the like as automotive equipment.

The invention relates specifically to reflector devices comprising a reflector and a condensing lens, the said reflector comprising one point at least in its reflecting surface from which rays of light which may impinge thereon from a distant source are reflected back in directions in general parallel relation to each other and in general parallel relation to the incident rays, although there generally is sufficient spreading of the rays to produce a beam of sufficient spread so that a person located near to but laterally of the source of light would receive some of the reflected rays. Other portions of the reflecting surface of the reflector should be so located with respect to the lens that the rays of light from a distant source of light which may impinge thereon are dispersed for the purpose and in the manner hereinafter fully set forth.

The general object of the invention is to provide a reflector device of the character or type indicated having means whereby some of the light rays reflected thereby from a source of light located either a relatively great distance from the device or a short distance therefrom are rendered visible to a person who may be located near to but laterally of the source of light. This characteristic of the device of my invention is of especial utility and advantage when it is used as a guide for traffic upon highways or streets, because when so used it usually is located off of the highway and in adjoining relation to a side thereof so that as an automobile or other vehicle approaches the same along the highway the angles between the beams of light from the sources of light of the head-lights of said automobile or other vehicle and the axial line of the said device increase. It is necessary, therefore, that means be provided whereby the light rays of a beam of light which enter the device and impinge upon the reflecting surface of the mirror or reflector thereof may be relatively widely dispersed so that even though the automobile or other vehicle may be relatively near the said device some of the rays from the source of light are received by the eyes of a person located relatively near to but laterally of the source of light, as for example the driver or chauffeur of an automobile.

A further object of the invention is to provide a reflector device of the type which is known as "self-focusing" with means whereby the rays of light of a beam of light which enter the device at a relatively great angle with respect to the axial line of the said device and from a source relatively near the device are relatively widely dispersed, so that a person located near the light but laterally thereof will receive some of the rays from the said source.

Without further extending the statement of the objects and advantages of my invention I shall now proceed with a detailed description thereof wherein other objects and advantages will be pointed out specifically or else will be apparent from such description.

In order that the invention may be readily comprehended and its great utility fully appreciated reference should be had to the accompanying drawing wherein I have illustrated the invention in a form of embodiment which has been found to be very satisfactory in practical use, although it will be understood that the principle of my invention may be embodied in devices of other forms of construction.

In the drawing:

Fig. 1 is a view in central longitudinal section of a reflector device embodying the invention;

Fig. 2 is a view in front elevation of the device shown in Fig. 1;

Fig. 3 is a view in front elevation of the device shown in Fig. 1 with the lens member removed therefrom; and Fig. 4 is a view in front elevation of a portion of a sign or other signal in which a plurality of devices embodying the invention are arranged in the form of the letter T.

In the drawing I have shown a receptacle of cylindrical shape and comprising an outer open end portion 1 and an inner end portion 2 the latter being of smaller diameter than the former so that between the two portions a ledge or flange-like part 3 is provided which constitutes a shoulder the inner edge of which acts as a support for the transparent condensing lens member 4, usually of glass. In the construction shown the lens member 4 is spherical but it need not be of that shape. To form a cushion seat for the member 4 and also to form a hermetical seal I have provided an annular washer 5 of rubber or the like the inner edge of which overlies the inner edge of the shoulder 3, as is clearly shown in Fig. 1 of the drawing. The lens member 4 is retained within the said receptacle by the engagement therewith of the inwardly turned outer edge portion 5' of the portion 1 of the side wall of the receptacle. Such inwardly turned portion 5' engages a portion of the surface of the member 4 outside of or beyond the point of greatest thickness of the said member. The bottom of the receptacle comprises, as illustrated, a central portion 6 having an inner spherical highly polished light reflecting surface 7 and also an outer annular spherical portion 8 having an inner highly polished spherical surface 9. The spherical surface 7 is located in the focal plane of the condensing member 4 so that the rays of a beam of light which impinge upon and which pass through the said lens member and converge toward and meet upon the spherical surface 7 are reflected back in directions substantially parallel with each other and in directions substantially parallel with the incident rays, there being sufficient scattering or diffusion of the rays, however, to enable a person located near to but laterally of the source of light to receive some of the reflected rays. Upon reference to Fig. 1 it will be noted that the rays of light of a beam of light which radiate from a source of light located more or less directly in front of the device and at a distance therefrom converge to and are focused upon the surface 7. This is indicated by the lines a, b and c. The arrows associated with the said lines indicate that rays of light both enter and leave the device along the same lines. A ray of light entering the device along the line a is reflected by the reflecting surface 7 and leaves the said device along the line c. Likewise a ray of light entering the device along the line c is reflected by the reflecting surface 7 and leaves the said device along the line a. A ray of light entering the device along the line b, which is normal to the spherical reflecting surface 7 is reflected back along the same line.

It will be noted that the reflecting surface 9 of the spherical portion or zone 8 of the reflector is located inwardly of the surface 6 so that the distance therefrom to the center of the lens member 4 is less than the distance from said center to the spherical surface 7 of the spherical portion 6 of the reflector. It will be apparent, therefore, that the parallel rays of a beam of light which impinge upon the spherical member 4 of the device at an angle sufficiently great that the refracted rays of incident light converge toward the spherical surface 9 do not meet upon the said surface but tend to meet and would meet if permittted so to do at a point in the focal plane of the said lens member 4 which lies back of the spherical reflecting surface 9. The rays of light which meet the reflecting spherical surface 9 are returned through the lens member 4 and issue from the latter in divergent directions. This is illustrated in Fig. 1 of the drawing wherein d and e represent spaced parallel incident rays of light. Upon entering the lens member 4 these rays are refracted as indicated in Fig. 1 and upon issuing therefrom converge toward a focal point 10, but before reaching that point they impinge upon the spherical reflecting surface 9 as indicated at 11 and 12. The ray d is reflected as indicated and emerges from the outer exposed surface of the lens member 4 as indicated by the line d' in divergent relation to the incident rays d and e. Likewise the incident ray e, after having been refracted in its passage through the lens member of the device tends to converge to the focal point 10, but contacts with the spherical surface 9 at the point 12, as already indicated, is reflected therefrom, and emerges from the outer exposed surface of the lens member 4 as indicated at e' in divergent relation to the incident rays d and e.

By thus providing the annular spherical reflecting surface 9 in a plane inwardly of the focal plane of the lens member 4 it will be apparent that the device embodying my invention is rendered highly practical and of great utility for use as an aid to traffic when placed contiguous to a side of a highway or street or at least to one side of the path of a highway or a street along which traffic moves. By reason of the presence of the annular reflecting surface 9 characterized as above described the device operates to disperse the rays of light emanating from a source of light located relatively near to and laterally of a line extending to the principal axis of the lens member so that some of the reflected rays are received by the eyes of a person who may be driving an automobile though he be located laterally of the source of light in the usual manner.

Although in the construction as illustrated I have shown two spherical surfaces 7 and 9 of considerable extent or area, it will be understood that my invention is not limited to reflecting surfaces related to each other in exactly the manner shown but that the purposes of the invention may be accomplished by otherwise relating portions of the reflecting surface of the reflector. There should be at least one point of the reflecting surface of the mirror which is located within or substantially within the focal plane of the condensing lens member of the structure but the remaining portions of the reflecting surface of the mirror may be displaced with respect to such focal plane without departing from the principle of my invention as illustrated in the drawing.

A device constructed to embody the principle of my invention as above described is of great value and utility as a means for guiding traffic upon highways and streets. This is due primarily to the fact that the rays of a beam or beams of light which radiate from a head-light or the head-lights of an automobile or other like vehicle and strike the lens member of the said device pass therethrough and impinge upon the reflecting surface of the reflector, are reflected back, and are received by the driver of the approaching automobile or other vehicle whether the latter be located a relatively great distance or a relatively short distance from the said device. If the device is located upon a side of a highway or to the side of the path of a highway along which the traffic moves it will be apparent that as an automobile or other vehicle approaches the same the angle between the rays of light from the head-lights and the principal axis of the device increases until finally the refracted incident rays converge toward the spherical surface 9 or some other reflecting surface located in displaced relation to the focal plane of the lens member of the device. In such event the said rays do not focus upon the reflecting surface and consequently the reflected rays emerge from the device in divergent relation with respect to each other and with respect to the incident rays. A practical feature of a device embodying my invention is that it is of a character such that it may be manufactured very economically and sold at relatively low price.

The device also may be used in the manufacture of signs wherein they are assembled in relation to each other to form letters or other symbols, whereby information may be positively and directly imparted.

From the foregoing it will be seen that I have produced a device of the character frequently denominated as a "self-focusing" reflector which is of a construction such that it may be manufactured at relatively low cost and also is of a character which is highly practical and of great utility.

Having thus described my invention, what I claim and desire to secure by Letters Patent is:

1. In a signaling device, the combination of a spherical condensing lens, and a curved reflector associated therewith and having a portion of its reflecting surface located in the foci of parallel rays of light impinging upon said lens from a source opposite the reflector and another portion offset therefrom and located between said lens and the foci of parallel rays impinging upon said lens and upon said last mentioned portion after traversing the lens.

2. In a signaling device, the combination of a spherical lens, and a spherical reflector associated therewith and having its center of curvature coinciding with the center of the lens, a portion of said reflector being located in the foci of parallel rays of light impinging upon said lens from a source opposite the reflector, and other portions of said reflector being offset therefrom and located between said foci and the lens.

3. In a signaling device, the combination of a spherical condensing lens, and a curved reflector associated therewith and having the central portion of its reflecting surface located in the foci of parallel rays of light impinging upon said lens from a source opposite the reflector, and a surrounding portion offset therefrom and located between the lens and the foci of parallel rays impinging upon said surrounding portion after traversing the lens to effect divergence of the light rays passing through the lens and reflected by said surrounding portion.

4. In a signaling device, the combination of a spherical lens, and a spherical reflector associated therewith and having its center of curvature coinciding with the center of the lens, the central portion of said reflector being located in the foci of parallel rays of light impinging upon said lens from a source opposite the reflector, and the surrounding portion of said reflector being offset therefrom and located between said foci and the lens.

5. In a signaling device, the combination of a spherical lens, and a reflector associated therewith and having a central area comprising a spherical reflecting surface located in the foci of parallel rays of light impinging upon said lens from a source opposite the reflector, the center of curvature of said spherical reflecting surface coinciding with the center of the lens, and a surrounding area comprising a spherical reflecting surface offset from said central area and located between said foci and the lens.

6. In a signaling device, the combination of a casing having an open end and a closed end provided with a spherical reflecting surface on the inner face thereof, a spherical lens secured in the open end of the casing and having its center coinciding with the center of curvature of said reflecting surface, the central portion of said reflecting surface being located in the foci of parallel rays of light impinging upon the said lens from a source opposite the reflector, and the surrounding portion being offset therefrom and located between said foci and the lens to effect divergence of light rays passing through the lens and impinging thereon.

7. In a signaling device, the combination of a casing having an open end and a closed end provided with a curved reflecting surface on the inner face thereof, a spherical condensing lens secured in the open end of the casing, the central area of said reflecting surface being located in the foci of parallel rays of light impinging upon said lens from a source opposite said reflecting surface, and the surrounding area of said reflecting surface being offset therefrom and located between the lens and the foci of parallel rays impinging upon said surrounding area after traversing the lens.

RICHARD W. LUCE.